(12) United States Patent
Thorne

(10) Patent No.: US 6,357,215 B1
(45) Date of Patent: Mar. 19, 2002

(54) VEGETATION CUTTING TOOL AND BLADE

(76) Inventor: Peter Thorne, Cork Street, Gundaroo, NSW 2620 (AU)

( * ) Notice: Subject to any disclaimer, the term of this patent is extended or adjusted under 35 U.S.C. 154(b) by 0 days.

(21) Appl. No.: 09/445,395

(22) PCT Filed: Apr. 9, 1998

(86) PCT No.: PCT/AU98/00249

§ 371 Date: Dec. 7, 1999

§ 102(e) Date: Dec. 7, 1999

(87) PCT Pub. No.: WO98/57533

PCT Pub. Date: Dec. 23, 1998

(30) Foreign Application Priority Data

Jun. 16, 1997 (AU) ................................................ PO7390

(51) Int. Cl.[7] .............................................. A01D 34/63
(52) U.S. Cl. ........................................ 56/295; 56/255
(58) Field of Search ................. 56/12.7, 16.7, 56/255, 295; 30/276

(56) References Cited

U.S. PATENT DOCUMENTS

| | | | | |
|---|---|---|---|---|
| 2,634,571 A | * | 4/1953 | Lawrence et al. | 56/12.7 |
| 3,320,733 A | * | 5/1967 | Kirk | 56/295 |
| 3,327,460 A | * | 6/1967 | Blackstone | 56/295 |
| 3,507,104 A | * | 4/1970 | Kline et al. | 56/295 |
| 4,058,959 A | * | 11/1977 | Moss et al. | 56/295 |
| 4,229,933 A | * | 10/1980 | Bernard | 56/295 |
| 4,611,459 A | * | 9/1986 | Cartner | 56/12.7 |
| 4,996,828 A | * | 3/1991 | Jetzinger | 56/12.7 |
| 5,649,413 A | * | 7/1997 | Oostendorp | 56/12.7 |

FOREIGN PATENT DOCUMENTS

| | | |
|---|---|---|
| AU | 20246/95 A | 11/1995 |
| AU | 68019/96 A | 4/1997 |
| EP | 0 132 385 A1 | 1/1985 |
| GB | 1236158 | 6/1971 |
| NL | 8403-911 A | 7/1986 |
| WO | WO 81/00337 A | 2/1981 |

* cited by examiner

*Primary Examiner*—Thomas B. Will
*Assistant Examiner*—Meredith C. Petravick
(74) *Attorney, Agent, or Firm*—Piper Marbury Rudnick & Wolfe LLP; Wilburn L. Chesser; Amy L. Miller

(57) ABSTRACT

A vegetation cutting tool such as a brush cutter, lawn mower, etc. includes a hub (110) for mounting on the rotary shaft of the brush cutter and blades (112) mounted thereto via pivoted links (116). In use the blades are held by rivets (114), having enlarged eccentric heads (122), which are received in keyhole-shaped slots in the blades. Thus the blades may be readily removed without tools by first rotating a blade and then translating it relative to the hub. The blades may be enlarged in width towards their distal ends which are radiused with a smaller radius than that of the cutting circle.

10 Claims, 8 Drawing Sheets

US 6,357,215 B1

VEGETATION CUTTING TOOL AND BLADE

FIELD OF THE INVENTION

This invention relates to a vegetation cutting tool and to a blade therefor.

Although a main use for the present invention and the following description is in relation to a vegetation cutting tool known as a brush cutter, it is to be understood that as used herein the expression "vegetation cutting tool" is not limited to a tool for use with a brush cutter per se. It is to be understood to refer in general to cutting tools which connect to a rotating shaft in a variety of cutting appliances such as, for example, brush cutters, lawn or grass mowers, garden edgers etc.

BACKGROUND ART

A brush cutting tool including a circular hub and a nylon cord is well known. As the hub spins on the shaft of a brush cutter, the nylon cord assumes a radial orientation due to centrifugal force and acts as the cutting member. A major drawback with nylon cord brush cutting tools is that the cord lacks robustness and must be regularly replaced. Furthermore, nylon cord brush cutters struggle to cut through tougher weeds and other vegetation.

Also known is a brush cutting tool including a circular hub and a fixed radial blade member. Whilst such arrangements can generally deal with tougher weeds and are more robust than the nylon cord cutters, they suffer a number of disadvantages including the undesirable tendency to transmit impact shock to the brush cutter in the event that the blade member strikes a rock or the like.

Also known are grass mowers having as the cutting tool a hub with blade members mounted thereto.

SUMMARY OF THE INVENTION

In one aspect this invention resides broadly in a vegetation cutting tool including:
 a hub adapted to be mounted on the shaft of a vegetation cutter or the like for rotation therewith, and
 a blade removably mounted to the hub, the blade being manually movable between an operative cutting position and a dismount position in which the blade can be dismounted from the hub.

In the preferred embodiment movement of the blade from the operative position to the dismount position involves pivoting of the blade relative to the hub and translation of the blade relative to the hub.

In the preferred embodiment said translation prior to said pivoting is prevented by abutment means such that said pivoting must occur first.

In the preferred embodiment the blade and the hub are mounted together via a post and slot arrangement. The hub preferably includes a post having an enlarged head and the blade includes a slot dimensioned to receive the post, the slot having an enlarged portion adapted to receive the enlarged head of the post. The slot preferably extends in a generally radial direction when the blade is in the operative position and the enlarged portion of the slot is located at the radially outer end of the slot. It is preferred that in said dismount position, the enlarged portion of the slot is aligned with the enlarged head of the post. Preferably the enlarged head is eccentric with respect to the post and the enlarged portion of the slot is offset from the centreline of the slot.

In another aspect the invention resides in a blade for a rotating vegetation cutting tool, the blade including:
 first end including means for mounting the blade to the vegetation cutting tool; and
 a second end having a radius of curvature less that the radius of the cut made by the blade in use.

Preferably, the radius of curvature of the second end of the blade is between 25 to 75 percent of the radius of the cut made by the blade in use. In the preferred embodiment the radius of curvature of the second end of the blade is approximately 50 percent of the radius of the cut made by the blade in use.

It is preferred that the blade includes cutting edges extending between the first and second ends, the cutting edges diverging towards the second end. The blade may also include a cutting face inclining inwardly of the cutting edges.

Preferably the cutting edges have opposed cutting faces inclining inwardly of each cutting edge. The blade may also include abutment faces extending inwardly from the circumferentially opposed end points of the second end to meet respective cutting faces, said abutment faces being substantially parallel to the axis of rotation of the vegetation cutting tool.

In another aspect the invention resides in a blade for a rotating vegetation cutting tool, the blade being manually removable from the vegetation cutting tool.

In another aspect the invention resides in a blade for a rotating vegetation cutting tool, the blade including:
 a first end including means for mounting the blade to the vegetation cutting tool;
 a second end; and
 cutting edges extending between the first and second ends, the cutting edges diverging towards the second end.

In another aspect this invention resides broadly in a blade for a rotating vegetation cutting tool, the blade including:
 first end including means for mounting the blade to the vegetation cutting tool;
 a second end;
 cutting edges extending between the first and second ends, and
 opposed cutting faces inclining inwardly of each cutting edge.

In another aspect this invention resides broadly in a blade for a rotating vegetation cutting tool, the blade including:
 a first end including means for mounting the blade to the vegetation cutting tool;
 a second end;
 cutting edges extending between the first and second ends;
 cutting faces inclining inwardly of said cutting edges, and
 abutment faces extending inwardly from the circumferentially opposed end points of the second end to meet respective cutting faces, said abutment faces being substantially parallel to the axis of rotation of the vegetation cutting tool.

In another aspect the invention resides in a vegetation cutting tool including a blade as defined above.

In another aspect this invention resides in a vegetation cutting tool including:
 a hub adapted to be mounted on the shaft of a vegetation cutter or the like for rotation therewith;
 a link member pivotably mounted with respect to the hub; and
 a blade member pivotably mounted with respect to the link member;

wherein the hub includes two diametrically opposed lobes, each lobe including mounting means for pivotably mounting a link member.

Preferably, the link member is pivotably mounted with respect to the hub for relative rotation about a first axis and the blade member is pivotably mounted with respect to the link member for relative rotation about a second axis, the first and second axes being spaced and parallel. Preferably also, the hub, link member and blade member lie in a common plane, the plane being perpendicular to the first and second axes. Also the link member preferably includes a pair of spaced arms which straddle the hub and the blade member.

Preferably, the hub, link member, and blade member jointly define a leading edge adapted to cut vegetation, and wherein the leading edge is shaped such that cut vegetation may slide outwardly along the leading edge.

It is also preferred that there is a smooth transition between the portion of the leading edge defined by the hub and the portion of the leading edge defined by the link member. Also there is preferably a smooth transition between the portion of the leading edge defined by the link member and the portion of the leading edge defined by the blade member.

BRIEF DESCRIPTION OF THE FIGURES

In order that this invention may be more easily understood and put into practical effect, reference will now be made to the accompanying drawings which illustrate a preferred embodiment of the invention, wherein.

BEST MODE

Figure 1:
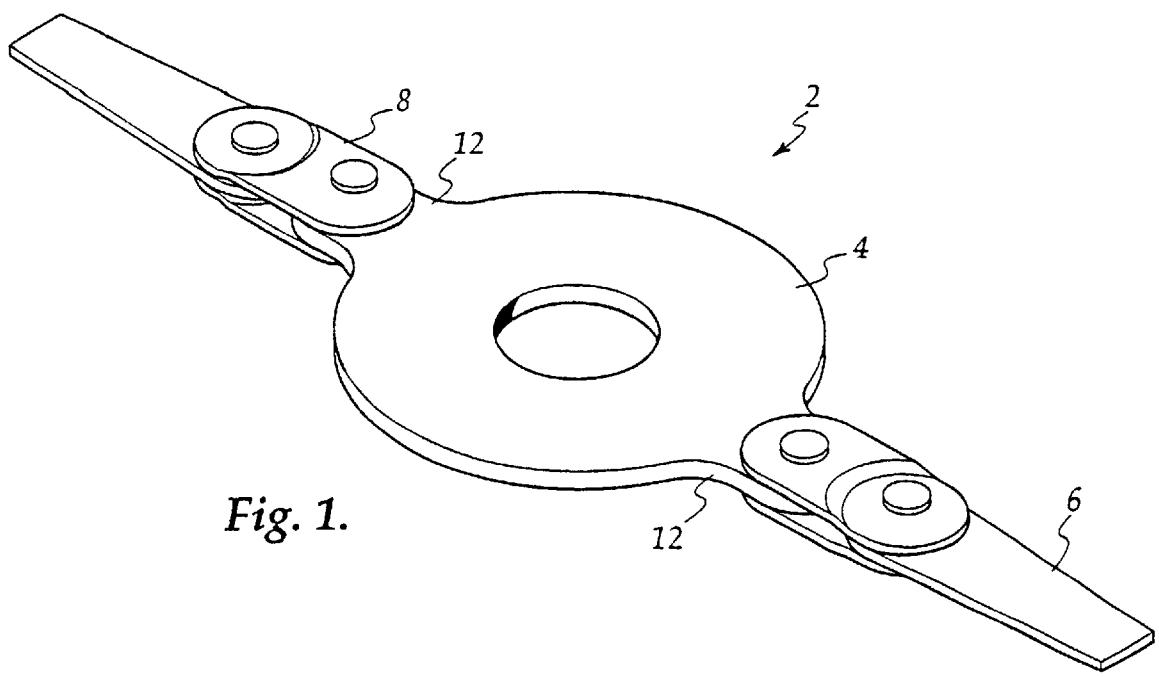
FIG. 1 is a perspective view of a vegetation cutting tool according to the invention.
Figure 2:
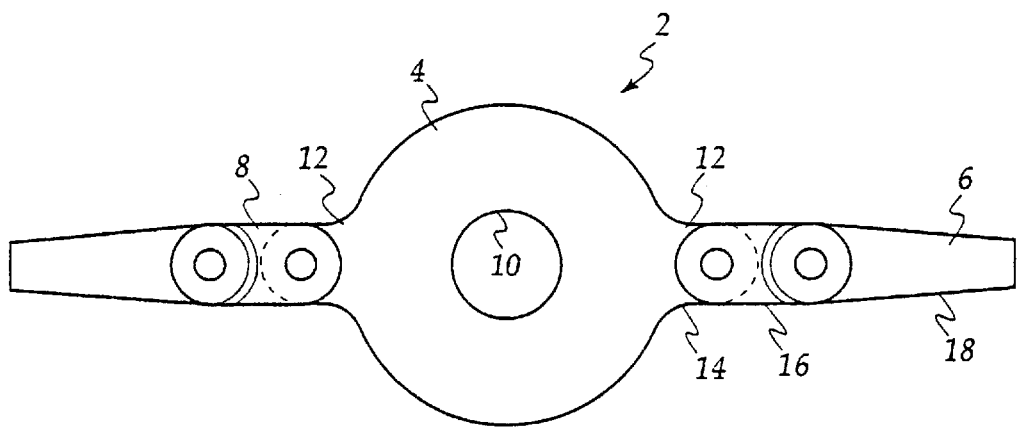
FIG. 2 is a plan view of the vegetation cutting tool of FIG. 1.
Figure 3:
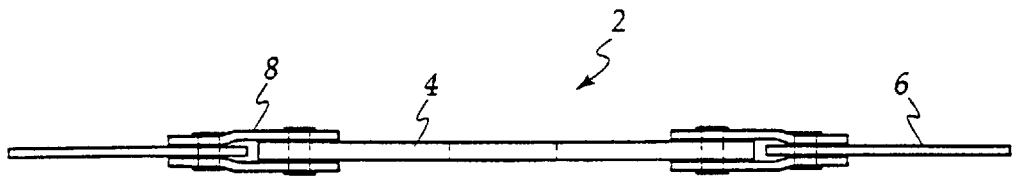
FIG. 3 is an elevation view of the vegetation cutting tool of FIG. 1.

With reference to FIGS. 1 to 3 vegetation cutting tool 2 includes hub 4 and blade members 6 pivotably mounted to the hub by link members 8.

It will be noted that link members 8 include a pair of spaced arms which straddle hub 4 and blade member 6. The components are riveted together for pivotable movement.

Hub 4 includes a central aperture 10 which, in use, receives the spigot or shaft of the vegetation cutter or the like. The aperture is not threaded and therefore is compatible with all vegetation cutters. Hub 4 is generally round in shape with diametrically opposed lobes 12.

Due to the shape of hub 4, link members 8 and blade members 6 may pivot through a substantial angle relative to hub 4 before abutting or impacting hub 4. This assists in avoiding the transmission of impact shocks to the gearbox of the vegetation cutter pursuant to the blade member striking a rock or the like.

It will also be noted that the vegetation cutting tool as a whole is substantially planar and that the components of the vegetation cutting tool pivot relative to each other about axes which are perpendicular to the, plane. As a result, when blade member 6 rebounds from striking a rock or the like, it strikes hub 4 rather than striking the shaft of the vegetation cutter.

The hub, by virtue of its shape, assists in cutting and greatly reduces tangling in long grass. When tangling does occur, it is relatively easy to clear.

If vegetation cutting tool 2 was rotated in a clock-wise direction, peripheral edge 14 of hub 4, peripheral edge 16 of link member 8 and peripheral edge 18 of blade member 6 together define the leading or cutting edge of the tool.

The leading or cutting edge is substantially smooth or devoid of obstructions or protrusions which would prevent vegetation which is cut by the tool from sliding outwardly along the leading edge due to centrifugal force. This feature assists in shedding vegetation and preventing tangling of the tool.

The tool is preferably made of steel although it could made of other material such as plastics. In one embodiment the hub and link members are steel however the blade member is plastics and is replaceable.

Due to the symmetry of the tool it can be rotated in either direction. This means the tool can be reversed when one leading edge becomes worn. The trailing edge then becomes the new leading edge.

It has been found that the blades do not require sharpening. Rather the leading edge of the blade which is initially square in section wears to a curved shape which, if anything, is sharper.

Figure 4:
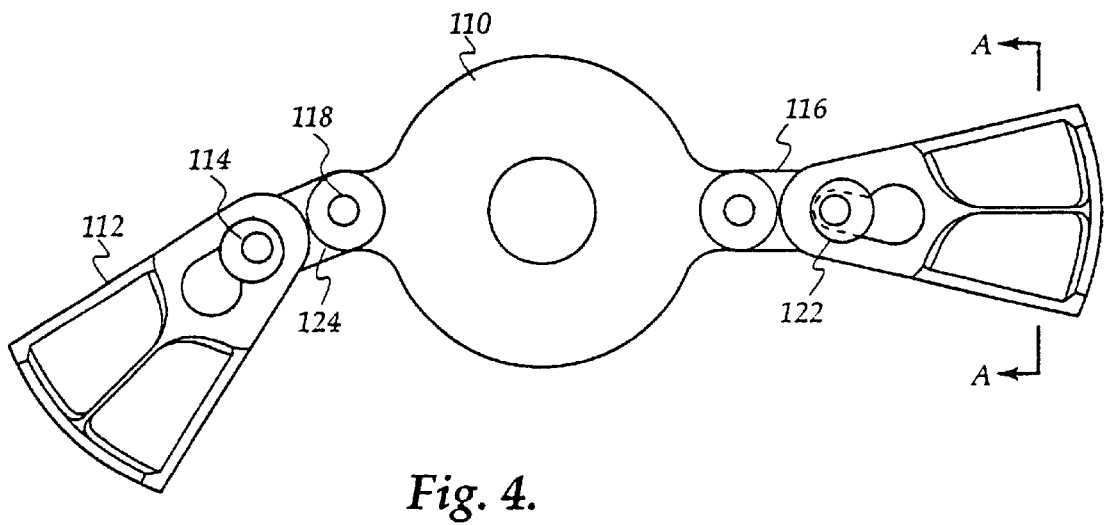
FIG. 4 is a plan view of a vegetation cutting tool having two removable blades.
Figure 6:
FIG. 6 is a section view through line A—A of FIG. 4.

With reference to FIGS. 4 and 6 the vegetation cutting tool of this embodiment includes a hub 110 having a central aperture adapted to receive a rotary drive shaft such as the drive shaft of a motorised vegetation cutter or the like.

Blades 112 are pivotally mounted via rivet 114 to link 116 which, in turn, is pivotally mounted via rivet 118 to hub 110.

Blade 112, which is preferably made of a plastics material, includes a slot 120 (refer to FIG. 7D) having an enlarged portion at one end thereof. It will be noted that, in use, slot 120 extends generally radially of the blade (it actually extends parallel to one edge of the blade) and includes an enlarged portion at the radially outer end of the slot.

Link 116 includes an upstanding post having an eccentric enlarged head 122. The slot 120 is sized so as to receive the upstanding post. The enlarged portion of the slot is sized so as to receive the enlarged head 122 of the upstanding post.

The dismounting of the blade 112 will now be described with reference to FIGS. 7A to 7B.

Initially the blade will be in the operative position (FIG. 7A) in which it adopts a substantially radial orientation.

Figure 7A:
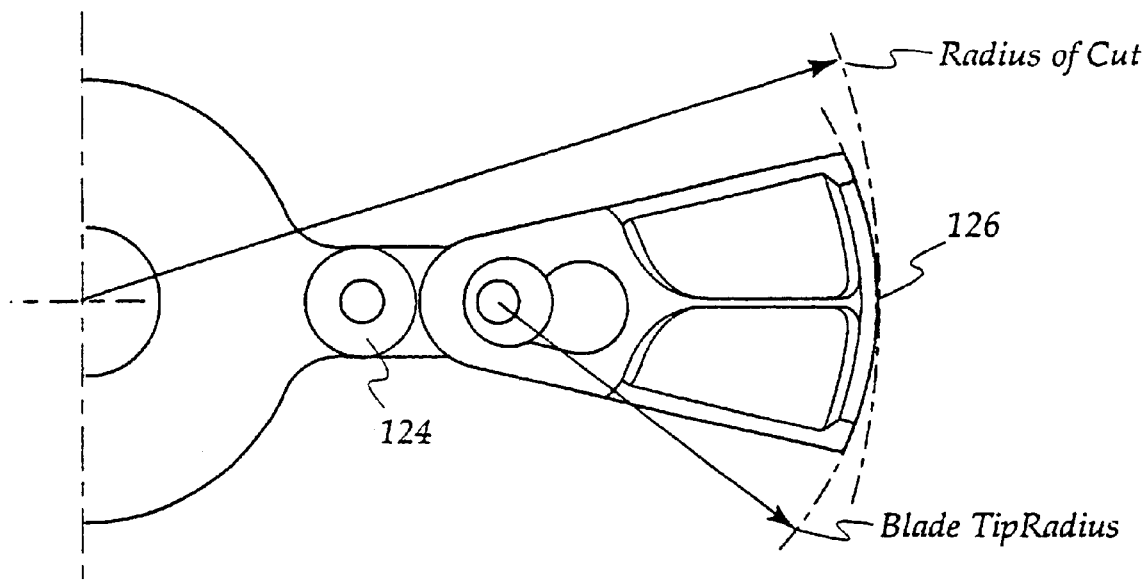
FIGS. 7A–7D are a series of sequential views showing the removal of a blade.
Figure 7B:
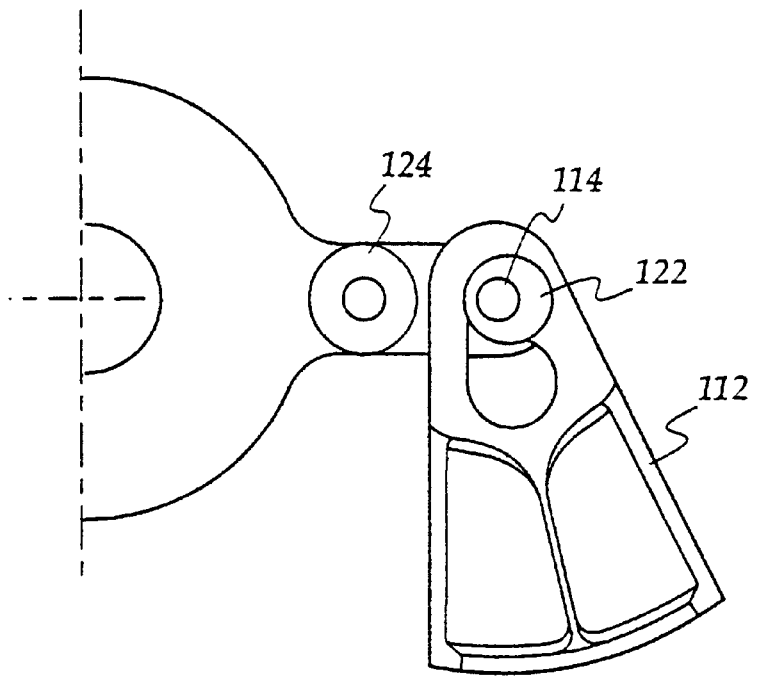

To dismount the blade, the blade is first pivoted about rivet 114 to the orientation shown in FIG. 7B.

Figure 7C:
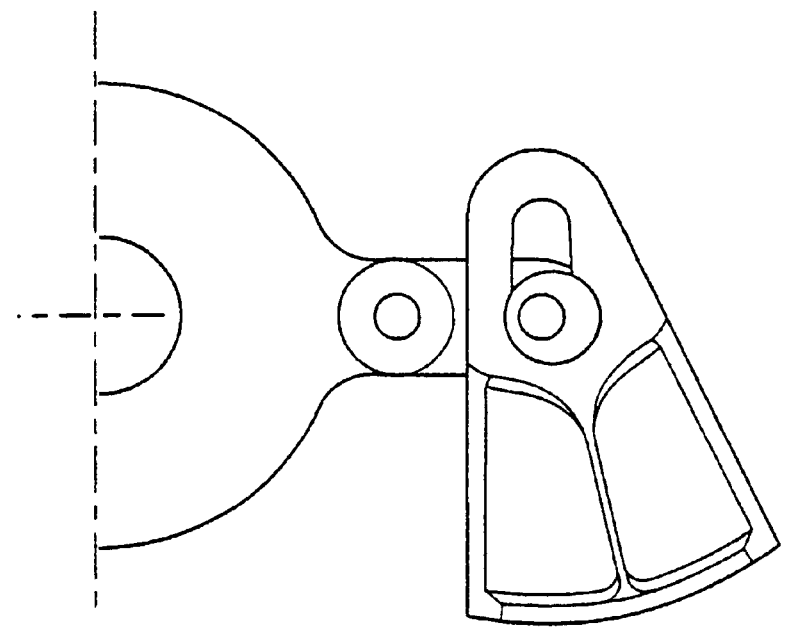
Figure 7D:
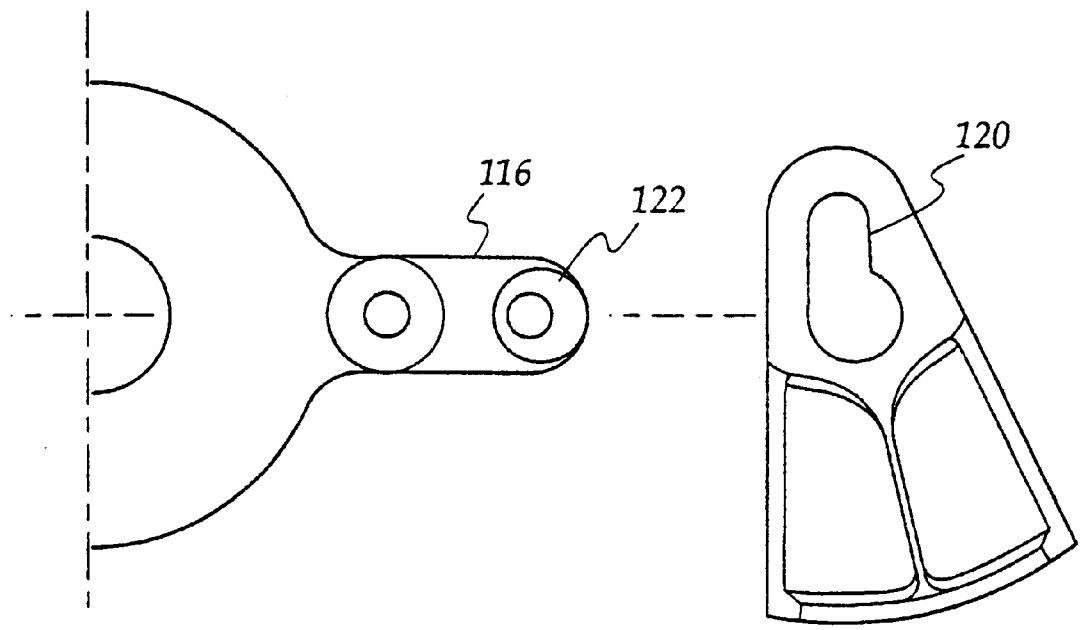

Thereafter, the blade is translated to the orientation shown in FIG. 7C. It will be appreciated that as the blade is translated, slot 120 is traversed by the upstanding post extending upwardly from the link 116. As shown in FIG. 7C, after the blade has been translated, the eccentric enlarged head 122 of the upstanding post aligns with the enlarged portion of the slot 120. The blade can then be dismounted as shown in FIG. 7D.

It will be understood that translation of the blade prior to pivoting of the blade is impossible due to the presence of abutment means 124 which is provided by the edge of the hub 110. This will be best understood with reference to FIG. 7A where it will be noted that blade 112 cannot be translated in a radially inward direction due to the presence of abutment means 124.

Re-mounting of the blade follows the same steps in the opposite order.

Blade 112 includes a number of innovative features relating to its shape.

Firstly, with reference to FIG. 7A, it will be observed that blade 112 has a radially outer end 126 which has a radius of curvature which is less than the radius of the cut performed by the blade in use, ie. the blade tip radius is less than the radius of cut (put another way, the blade tip is more convex than the arc defined by the blade tip as it rotates). This feature has been found to be particularly advantageous in avoiding damaging both the blade and objects such as tree trunks. It will be understood that as the rotating blade is advanced towards the tree trunk to clear grass, for example, from around the tree trunk, the only portion of the blade which will strike the tree trunk is the curved convex end 126 of the blade which will contact the tree trunk in a not-damaging sliding manner.

A second feature of the blade is its "reverse" taper. Normally, blades tend to be straight or taper towards the tip of the blade. In contrast the present blade tapers towards the base of the blade. This means that the maximum amount of material is delivered to the location of maximum wear. A further advantage of this blade shape flows from the fact that the leading edge of the blade is not parallel to the radial direction, but rather is advanced relative to the radial direction (refer to FIG. 7A). In contrast, a conventional blade which tapers towards the tip will have a leading edge which is retarded relative to the radial direction. As wear occurs, the leading edge becomes more retarded and can quickly reach a point where vegetation slides off the blade due to its laid back angle of attack rather than being cut by the blade. Thus, starting with leading edge in an advanced position allows greater wear to occur before cutting efficiency is lost.

It should be noted that the blade is reversible, ie. when one leading edge is worn the blade can be dismounted, turned over and remounted to present a fresh leading edge.

Figure 8:
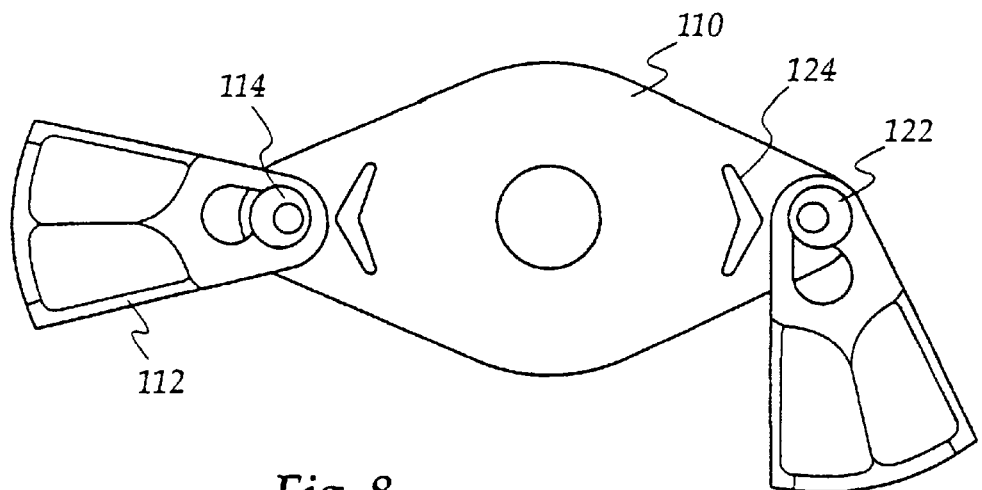
FIG. 8 is a plan view of another embodiment of a vegetation cutting tool having two removable blades.
Figure 9:
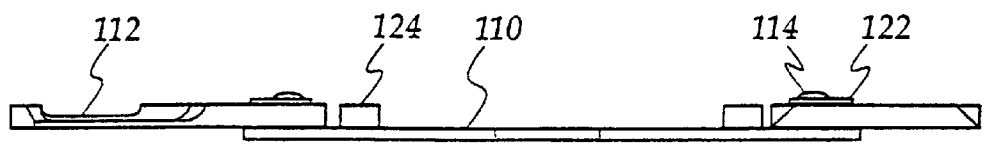
FIG. 9 is an elevation view of the vegetation cutting tool of FIG. 8.
Figure 10:
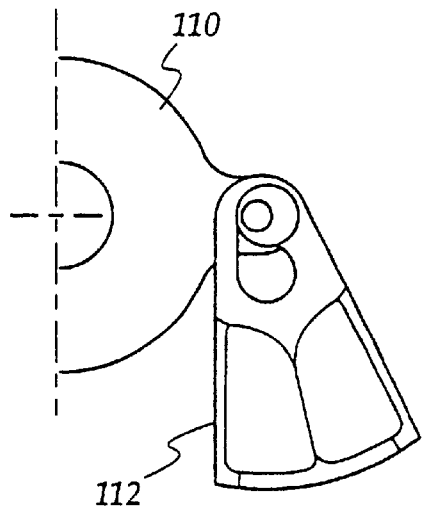
FIG. 10 is a partial plan view of another embodiment of a vegetation cutting tool.

Referring now to FIGS. 8 to 10, there are shown further embodiments of the invention in which the blades 112 are mounted directly to the hub 110 rather than via a link.

In the embodiment shown in FIGS. 8 and 9, the abutment means 124 are shaped so that contact between the blade and abutment means, as may occur when the blade rebounds after striking an object, occurs over an enlarged area so as to ameliorate damage to the plastics blade. The abutment means still performs the function of preventing the blade from being translated prior to pivoting.

In the embodiment shown in FIG. 10, the abutment means have been omitted.

Figure 11:
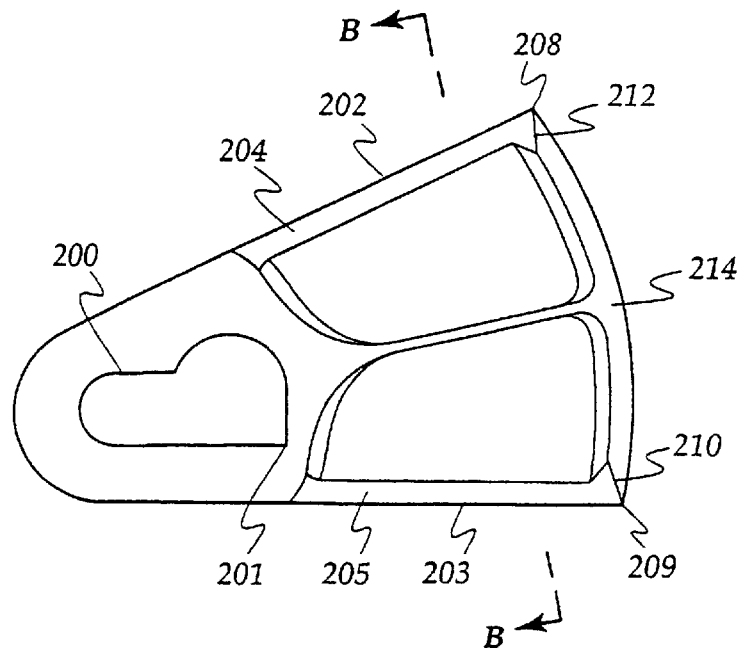
FIG. 11 is a plan view of another embodiment of a blade for a vegetationcutting tool.

As seen in FIG. 7D, the enlarged portion at the end of mounting slot 120 can meet the radially outermost side of the radially directed portion of slot 120 in a smooth or substantially tangential transition. Alternatively as seen in FIG. 11, the enlarged portion at the end of the mounting slot can meet the narrower radially directed portion 200 of the mounting slot substantially orthogonally as seen at 201.

Figure 14A:
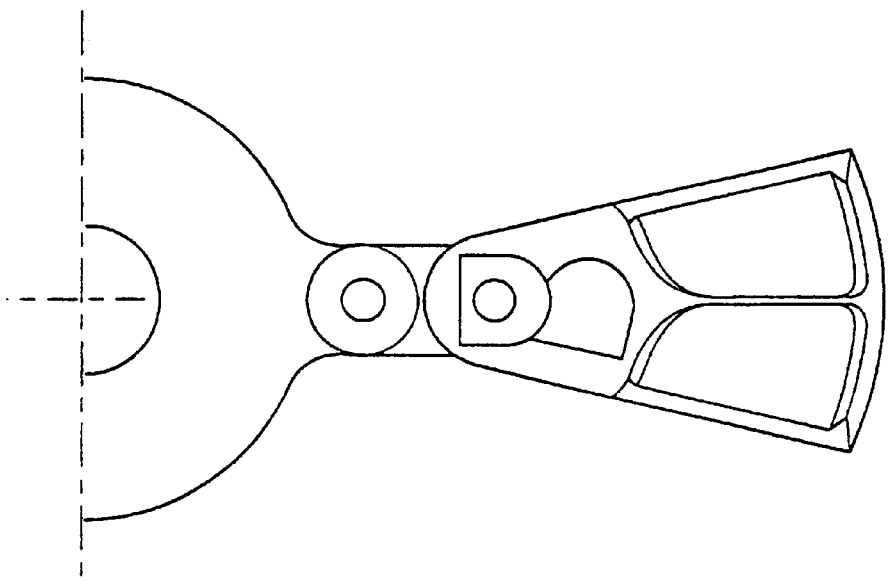
FIGS. 14A–14D are a series of sequential views showing the removal of a blade.
Figure 14B:
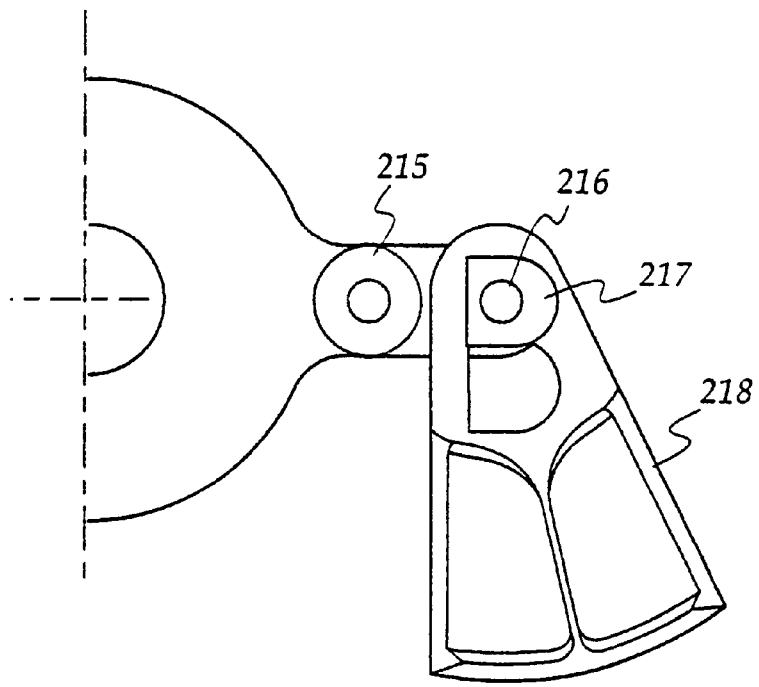
Figure 14C:
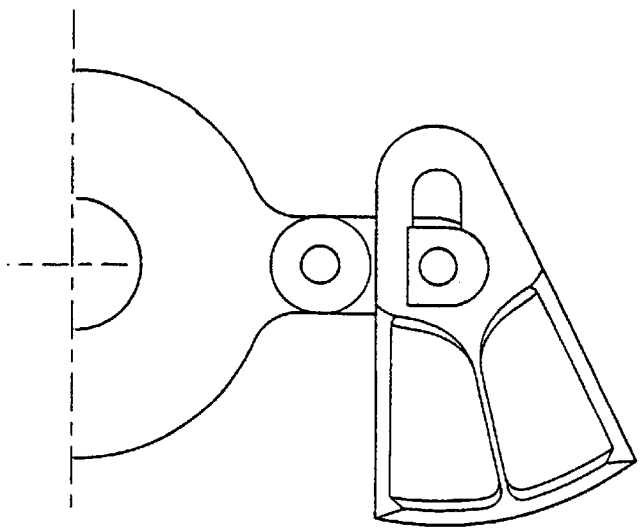
Figure 14D:
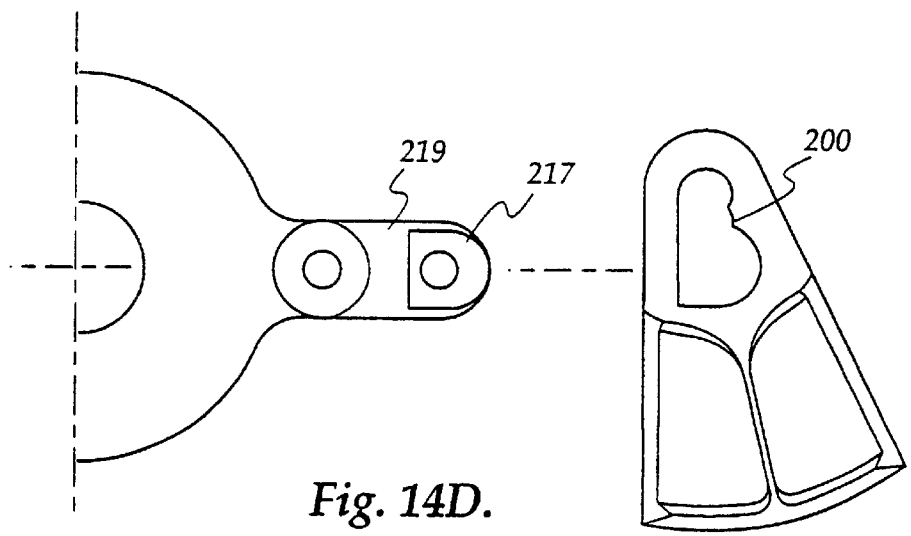

This latter arrangement has a number of advantages and in particular the possibility of the blade disengaging from the mount during operation is ameliorated because the square-edged (D-shaped) head of upstanding post 217 (see FIGS. 14B and 14D) greatly reduces the angular range within which the blade can be dismounted.

FIGS. 14A to 14D illustrate the manner in which the blade is dismounted in similar manner to that described above with reference to FIGS. 7A to 7D.

Figure 5:
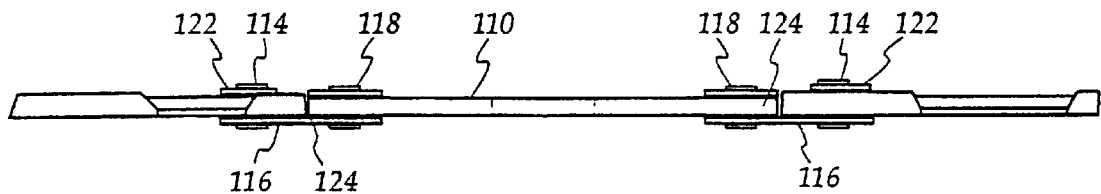
FIG. 5 is an elevation view of the vegetation cutting tool of FIG. 4.
Figure 12:
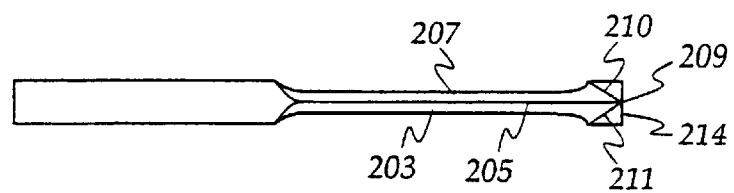
FIG. 12 is a side elevation of the blade shown in FIG. 11.
Figure 13:
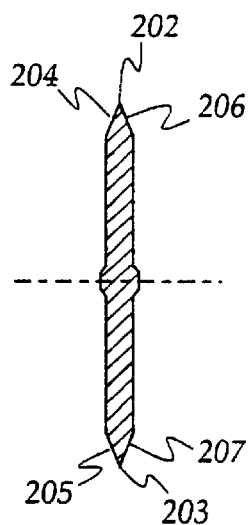
FIG. 13 is a section view through line B—B of FIG. 11.

The blade may have a single sided cutting edge as illustrated in FIGS. 5 and 6. Alternatively as seen in FIGS. 11 to 13, the blade can be balanced and have double sided cutting edges 202 and 203 having respective cutting faces 204,206 and 205,207 inclining inwardly thereof. This latter arrangement has the advantage that no confusion arises when the blade is reversed in that both sides look the same. In comparison with the single, bevelled edge arrangement illustrated in FIG. 7A, the double-sided cutting edges illustrated in FIGS. 14A to 14B have a reduced tendency to throw debris in an upwardly direction toward the operator.

The cutting faces at the outer tips 208,209 of radially outer end 126 can extend fully to the face of outer end 126 as seen in FIGS. 4 to 10. Alternatively as seen in FIGS. 11 to 13, instead of extending fully to the face of outer end 214, the cutting faces can terminate at substantially vertical abutment faces (see 210,212 in FIG. 11 and 210,211 in FIG. 12) which extend diagonally inwardly from the circumferentially opposed outer tips 208,209 of outer end 214.

Figure 15:
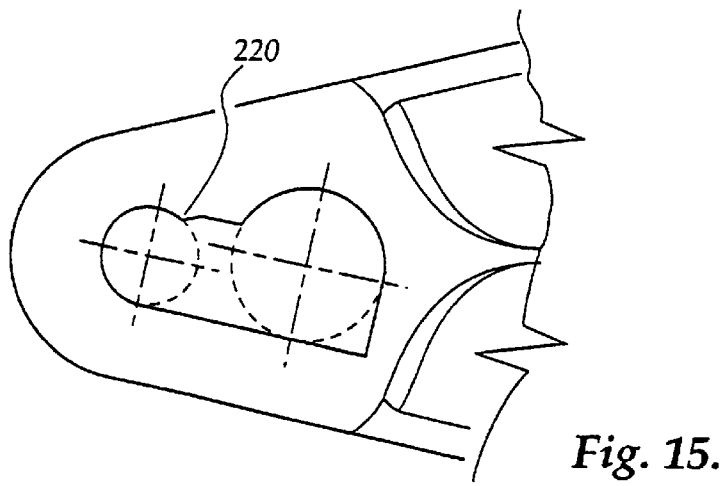
FIG. 15 illustrates a blade having a retaining lug on the mounting slot.

As can be seen in FIG. 15, a retaining lug 220 can be utilised to positively retain the mounting post within the end of the mounting slot when the blade is not in use. Lug 220 can be located on either side of the slot or alternatively a pair of shallower lugs can be utilised, opposed to each other on opposite sides of the slot. The position of lug 220 is such as to allow free rotation of the blade about the mounting post.

The provision of a retaining lug has a number of advantages. It provides a measure of confidence to a user who can be reassured that the blade will not separate during use because of the positive clipping action necessary to force the blade over the lug into the operative position at the end of the slot. Furthermore, because the lug(s) positively retains the blade on the mounting post, it is unlikely to be separated from the mounting post during storage or transportation.

In one aspect the preferred embodiment of the invention provides a vegetation cutting tool in which the blades are removable and replaceable. This is particularly advantageous where the blades are made of a plastics material. The blades may be mounted and dismounted without tools and it is practically impossible to incorrectly mount the blade. Once mounted the blade is secure and cannot accidentally dismount.

In another aspect the preferred embodiment of the invention provides a blade having a curved outer end which is particularly advantageous in clearing vegetation from around the base of a tree or the like without damaging the tree or blade.

In another aspect the preferred embodiment of the invention provides a blade having edges which diverge towards the radially outer end so as to provide a blade having superior wear characteristics and cutting efficiency.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. A vegetation cutting tool including at least one demountable blade which adopts a substantially radial orientation under centrifugal force, the demountable blade being mounted via a post and slot, the post having an enlarged head and being adapted to traverse the slot between an operative position whereat the blade may rotate, and a dismount position whereat the enlarged head of the post is aligned with an enlarged portion of the slot such that the blade can be dismounted;

wherein an abutment is provided adjacent the post;

wherein, when the blade is in the operative position, the blade must be rotated to a substantially non-radial orientation prior to translation to the dismount position;

wherein the blade is mounted to a link which is, in turn, pivotably mounted to a hub such that the link and blade tend to be substantially co-linear and radial under centrifugal force; and wherein the link must be substantially radial and the blade must be substantially nonradial before the blade can be dismounted from the link.

2. The tool as claimed in claim 1, wherein the link is mounted to the hub at a radially projecting lobe of the hub, said lobe being arcuate and constituting said abutment adjacent said post regardless of the orientation of the link relative to the hub.

3. The tool as claimed in claim 1, wherein the slot is narrowed adjacent the operative position such that the post is retained in the operative position in a snap-fit.

4. The tool as claimed in claim 1, wherein the enlarged head of the post is non-concentric with respect to the axis of the post.

5. The tool as claimed in claim 4, wherein the enlarged head of the post includes a straight edge which must be aligned with a side of the slot at the dismount position.

6. The tool as claimed in claim 1, wherein the post is disposed on the link and the slot is disposed in the blade.

7. A vegetation cutting tool including a hub and at least one blade-mounting post having an enlarged head;

wherein an abutment is provided adjacent the post for preventing demounting of a blade mounted on the blade-mounting post;

wherein the tool further includes a link pivotably mounted with respect to the hub at a lobe thereof, and the blade-mounting post is disposed on the link; and wherein the lobe of the hub constitutes said abutment.

8. The tool as claimed in claim 7, wherein the abutment is arcuate in shape and centered on the mounting point of the link to the hub such that the abutment is adjacent the post regardless of the orientation of the link relative to the hub.

9. A vegetation cutting tool including:

a hub;

a link pivotably mounted with respect to the hub about a first axis; and a blade pivotably mounted with respect to the link about a second axis which is parallel to and spaced from the first axis;

wherein the hub, link and blade lie in a common plane orthogonal to the first and second axes; and wherein the link is mounted to the hub at a projecting lobe thereof such that the link and blade may fold back adjacent the hub.

10. The tool as claimed in claim 9, wherein, when the link and blade are folded back against the hub, they lie substantially within the arc described by the lobe upon rotation of the hub.

* * * * *